United States Patent

[11] 3,581,995

| [72] | Inventor | Christoph Fischer |
| | | Bremen-Huchting, Germany |
| [21] | Appl. No. | 817,816 |
| [22] | Filed | Apr. 21, 1969 |
| [45] | Patented | June 1, 1971 |
| [73] | Assignee | Vereingte Flugtechnische Werke |
| | | Gesellschaft mit beschranker Haftung |
| | | fruher "Weser" Flugzeugbau Focke-wulf |
| | | Heinkel-Flugzeubau |
| | | Bremen, Germany |
| [32] | Priority | Apr. 25, 1968 |
| [33] | | Germany |
| [31] | | J21666 |

[54] DEVIATING DEVICE FOR PARTICULARLY HOT EXHAUST GAS JETS OF AIR VEHICLE DRIVING MECHANISMS
3 Claims, 1 Drawing Fig.

[52] U.S. Cl. .................................................. 239/265.19,
239/265.11, 239/519
[51] Int. Cl. ...................................................... B64c 15/00
[50] Field of Search .......................................... 239/265.11,
265.19–265.43, 519, 502, 505, 507, 509, 510, 513,
517; 60/230

[56] References Cited
UNITED STATES PATENTS

| 2,758,805 | 8/1956 | Graham | 239/265.25 |
| 2,986,002 | 5/1961 | Ferri | 239/265.39 |
| 3,292,864 | 12/1966 | Edkins | 239/265.19 |
| 3,351,291 | 11/1967 | Pohle | 239/517X |

Primary Examiner—M. Henson Wood, Jr.
Assistant Examiner—John J. Love
Attorney—Walter Becker ABSTRACT: A deviating device, especially for particularly - hot exhaust gas jets of air vehicle driving mechanisms, which comprises a plurality of metal strips or plates which are fixedly arranged on the outlet of the driving mechanism and which extend in the direction of the axis of the driving mechanism beyond the outlet of the driving mechanism. The metal strips or plates are for purposes of a jet deviation elastically deformable through the intervention of an adjusting device which is operatively connected to that end of the metal strips or plates which is remote from the outlet of the driving mechanism.

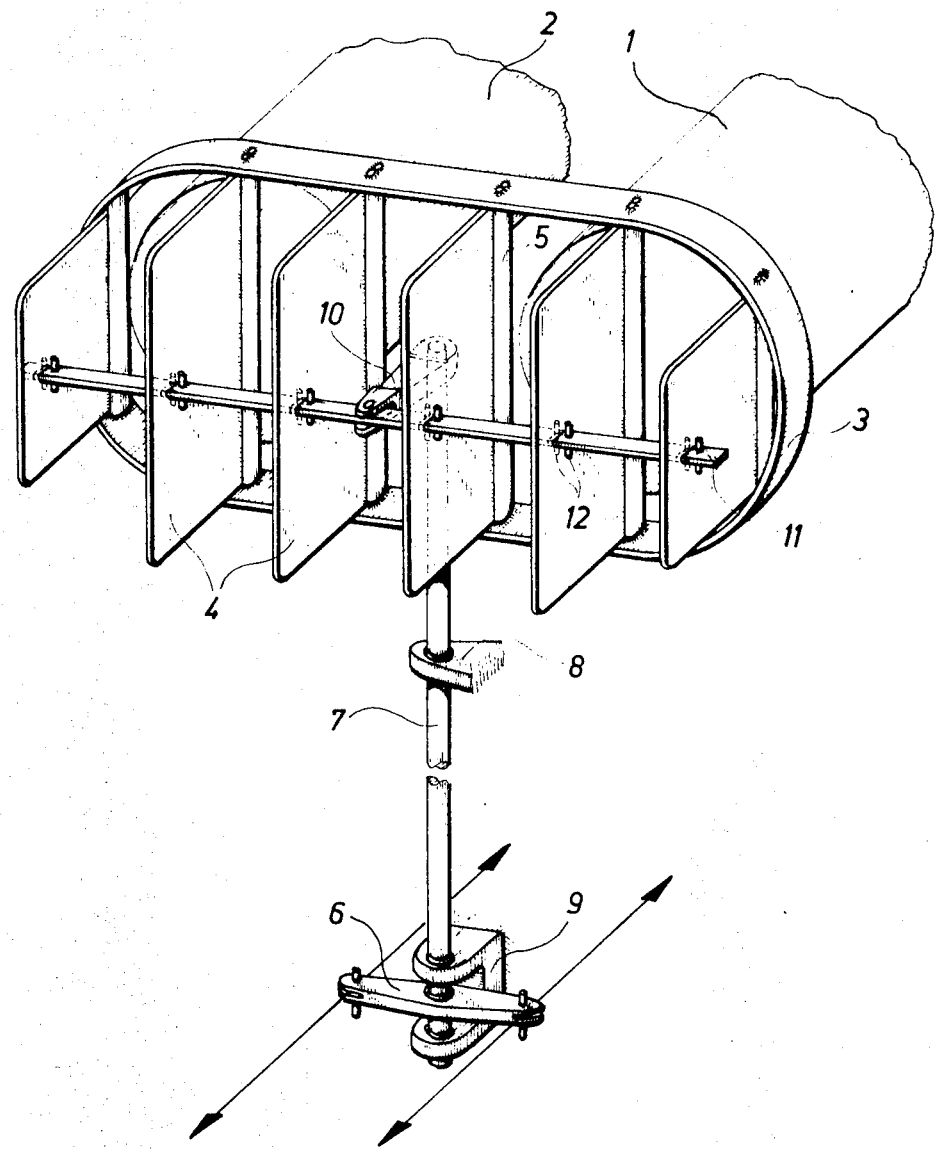
Inventor:
Christoph Fischer

DEVIATING DEVICE FOR PARTICULARLY HOT EXHAUST GAS JETS OF AIR VEHICLE DRIVING MECHANISMS

The present invention concerns a deviating device for particularly hot exhaust gas jets of air vehicle driving mechanisms. Deviating devices for the above-mentioned purpose are known which comprise pivotable aerodynamically favorable profiles or simple flaps by means of which the exhaust gas jets of one or more jet driving mechanisms can be deviated for purposes of guiding and directing said air vehicle. These profiles and flaps are rotatably arranged by means of bearings so that any desired adjustment can be effected in conformity with the desired operating conditions. In particular, when employing aerodynamically shaped profiles, these heretofore known arrangements have the drawback that the flow breaks away at adjusting angles exceeding relatively small deviating angles. Furthermore, these pivotably arranged aerodynamically shaped profiles and simple flaps have the drawback that the bearings are arranged within the region of the hot gases. Therefore, particularly expensive bearings have to be provided in order to assure the safety of operation of the deviating flaps.

It is also known to provide fixedly installed nonmovable flaps as deviating devices. Devices of this type, however, are useful only within narrow limits because they do not permit an adaptation to the individual conditions of operation.

It is, therefore, an object of the present invention to provide a device of the above-mentioned general type which will overcome the above outlined drawbacks.

It is another object of this invention to provide a deviating device for particularly hot exhaust gas jets of air vehicle drives which will be simple in construction, substantially nonsensitive to temperature influences, and which, when occupying a deviating position, will have a streamlined shape while simultaneously preventing the flow from breaking away at great deviating angles.

These and other objects and advantages of the invention will appear more clearly from the following specification in connection with the accompanying drawing showing a device according to the invention in which the exhaust gas jets are exhausted through two nozzles.

The deviating device according to the present invention is characterized primarily in that the deviating means comprises a plurality of metal strips or plates fixedly arranged at the outlet of the driving mechanism and extending in the direction of the axis of the driving mechanism beyond the said outlet, said metal strips or plates being elastically deformable by means of an adjusting device for purposes of deviating the jet, while the adjusting device engages that end of the metal strips which is remote from said outlet of the driving mechanism.

According to a further development of the invention, the adjusting device is connected to each metal strip by pins serving as followers. In this way a simple and flow nonsensitive connection is assured between the actuating means and the metal strips.

Referring more specifically to the drawing, the exhaust gas jets coming from the driving mechanism (not shown) are exhausted through two nozzles 1 and 2. The exhaust gas jets pass through a frame 3 surrounding said two nozzles 1 and 2. Arranged within said frame 3 is a plurality of metal strips or plates 4 which extend in the direction of the axes of said nozzles or driving mechanism and are provided with correspondingly profiled reinforcements 5. The metal strips 4 are rigidly connected to the frame 3.

The jet deviation is brought about by an elastic deformation of the metal strips or plates 4. To this end, a pendulum movement is conveyed to a two-arm lever 6 which in its turn is connected to a shaft 7. Shaft 7 is rotatably guided in bearings 8 and 9 and is adapted to convey the movement of lever 6 through the intervention of an arm 10 to an actuating bar 11 which is thus displaced in its longitudinal direction.

The actuating bar 11 is connected to that end of strips 4 which is remote from the outlet of the driving mechanism or nozzles 1, 2. This connection is effected by means of pins 12 acting as followers so that a displacement of the actuating bar 11 results in an elastic deformation of the metal strips 4 in the longitudinal direction of the actuating bar 11. With this deformation of the metal strips or plates 4, an aerodynamically favorable shape will be obtained so that the flow will occur along said metal strips or plates 4 even when great deviating angles are selected.

It is, of course, to be understood that the present invention is, by no means, limited to the particular showing in the drawing but also comprises any modifications within the scope of the appended claims.

What I claim is:

1. A deviating device for exhaust gas jets, especially for particularly hot exhaust gas jets, or an air vehicle driving mechanism having gas jet outlet means, which includes: a frame surrounding at least part of said jet outlet means, a plural of elastically deformable and flexible plate means arranged parallel to each other having portions at one end thereof fixedly connected to said frame and having their opposite end protruding in outward direction beyond said gas jet outlet means, and adjusting means operatively connected to said protruding ends of said plate means and operable to deflect said plate means to thereby deflect the gas jets leading said gas jet outlet means.

2. A deviating device for exhaust gas jets, especially for particularly hot exhaust gas jets, or an air vehicle driving mechanism having gas jet outlet means, which includes: a frame surrounding at least part of said jet outlet means, a plurality of elastically deformable and flexible plate means having portions at one end thereof fixedly connected to said frame and having their opposite end protruding in outward direction beyond said gas jet outlet means, adjusting means operatively connected to said protruding ends of said plate means and operable to deflect said plate means to thereby deflect the gas jets leading said gas jet outlet means, said adjusting means including an actuating bar connected to all of said plate means, lever means connected to said bar, and actuating means operatively connected to said lever means for selectively shifting the same in either direction to thereby move said bar in a corresponding direction for deflecting said plate means correspondingly.

3. A device according to claim 2, in which said bar extends through said plate means and adjacent said respective plate means is provided with a pair of pins arranged on opposite sides of the respective adjacent plate means.